US008055744B2

(12) United States Patent
Humphries et al.

(10) Patent No.: US 8,055,744 B2
(45) Date of Patent: Nov. 8, 2011

(54) RESOLUTION OF GROUP MEMBERSHIP FOR RESOURCES

(75) Inventors: Marshall Lee Humphries, Austin, TX (US); Thiha Than, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1610 days.

(21) Appl. No.: 11/100,908

(22) Filed: Apr. 7, 2005

(65) Prior Publication Data

US 2006/0229927 A1 Oct. 12, 2006

(51) Int. Cl.
*G06F 15/173* (2006.01)
*H04L 12/28* (2006.01)

(52) U.S. Cl. ........................ 709/223; 370/254

(58) Field of Classification Search .................. 709/206; 370/254
See application file for complete search history.

(56) References Cited

U.S. PATENT DOCUMENTS

| | | | |
|---|---|---|---|
| 6,119,125 A | 9/2000 | Gloudemann et al. | |
| 6,295,527 B1 | 9/2001 | McCormack et al. | |
| 6,338,070 B1 | 1/2002 | Nusch et al. | |
| 6,606,162 B1 * | 8/2003 | Simpson | 358/1.15 |
| 6,636,499 B1 * | 10/2003 | Dowling | 370/338 |
| 6,948,059 B1 * | 9/2005 | Sprecher et al. | 713/100 |
| 7,089,298 B2 * | 8/2006 | Nyman et al. | 709/220 |
| 7,237,243 B2 * | 6/2007 | Sutton et al. | 719/310 |
| 7,457,824 B1 * | 11/2008 | Strom et al. | 1/1 |
| 2002/0078021 A1 | 6/2002 | Lawton | |
| 2002/0156879 A1 * | 10/2002 | Delany et al. | 709/223 |
| 2003/0126137 A1 | 7/2003 | McFadden | |
| 2003/0200220 A1 | 10/2003 | Hu et al. | |
| 2004/0010606 A1 | 1/2004 | Delaney et al. | |
| 2006/0218147 A1 * | 9/2006 | Shrivastava et al. | 707/9 |

OTHER PUBLICATIONS

IBM Corp., "ASCII Interface for Group Membership Definition", IBM Technical Disclosure Bulletin, Aug. 1994, pp. 587-588 [online] Aug. 30, 2004 https://www.delphion.com/tdbs/tdb?order=94A+62715.

* cited by examiner

*Primary Examiner* — Tonia L. M. Dollinger
*Assistant Examiner* — Steven Nguyen
(74) *Attorney, Agent, or Firm* — Rabindranath Dutta; Konrad Raynes and Victor LLP

(57) ABSTRACT

Provided are a method, system, and article of manufacture, wherein a plurality of resources are grouped into a plurality of groups, wherein one group may be included in another in the plurality of groups, and wherein the plurality of resources and the plurality of groups comprise items. A recursive determination is made of valid items in a group by excluding those items that have already been determined to be included in the group.

24 Claims, 8 Drawing Sheets

RESOLUTION OF GROUP MEMBERSHIP FOR RESOURCES

BACKGROUND

1. Field

The disclosure relates to a method, system, and article of manufacture for the resolution of group membership for resources.

2. Background

Certain computing environments may include a plurality of resources, such as, printers, scanners, plotters, disk storage units, tape backup units, etc. Administrators and users of such computing environments may prefer to group the plurality of resources into a plurality of groups. The plurality of groups may be used to manage the plurality of resources. For example, certain laser printers may be included in a single group and administrators and users may interact with the group to manage and use the laser printers.

The grouping of resources into groups may allow administrators and users to interact with the resources more easily in comparison to interacting with individual resources. For example, administrators and users may prefer to deal with 10 groups of resources rather than 100 individual resources. Interaction with groups may include executing functions, such as print operations, store operations, etc., on resources included in the groups.

If heterogeneous resources are grouped together and functions executed against the group, errors may occur because functions may be executed against resources that were never intended to be associated with the functions. For example, if a printer and a scanner are included in the same group then an error may occur when a print operation is performed on the group and the print operation is executed on the scanner.

Additionally, in some computing environments nested groups, i.e., groups that include other groups, may be allowed for resources. The creation of nested groups may have the potential to create circular references. For example, if group A includes group B, and an administrator includes group A again in group B, then a circular reference is created.

Certain solutions may impose limitations on how groups are formed from resources. For example, a group may be restricted to include homogenous objects. Another restriction may limit the levels of group nesting that are allowed. Yet another restriction may limit the number of times a single resource can be assigned to a group.

SUMMARY OF THE DESCRIBED EMBODIMENTS

Provided are a method, system, and article of manufacture, wherein a plurality of resources are grouped into a plurality of groups, wherein one group may be included in another in the plurality of groups, and wherein the plurality of resources and the plurality of groups comprise items. A recursive determination is made of valid items in a group by excluding those items that have already been determined to be included in the group.

In further embodiments, a group membership definition is maintained for the group. A membership list to store the valid items for the group is also maintained. Further maintained is an already included list to store all previously processed items. Those items that are in the already included list are excluded from being added to the membership list.

In yet further embodiments, a request is received to perform an action against the group. The action is performed against at least one determined valid item in the group.

In still further embodiments, the recursive determining of the valid items in the group further comprises generating a membership list and an already included list. A group membership definition is read. If a type of an item in a selected group is a resource, then the resource is added to the membership list if the item is not in the already included list. A next item in the group membership definition is processed.

In additional embodiments, the recursive determining of the valid items in the group further comprises reading a group membership definition. If a type of an item in a selected group is another group, then the another group is added to a membership list if the another group is not in an already included list. A recursive processing of the another group is initiated.

In yet additional embodiments, the recursive determining of the valid items in the group further comprises reading a group membership definition. If a type of an item in a selected group is a filter, then the filter is added to a membership list if the filter is not in an already included list.

In further embodiments, an applicability check is performed to reduce the recursively determined valid items to those items on which a function being requested by a client are applicable.

In still further embodiments, timestamps are maintained for modifications to the plurality of groups and generation of the recursively determined valid items. The timestamps are used to determine whether to perform an additional recursive determination for new valid items for a plurality of requests on the plurality of groups.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments eliminate errors in nested groups by removing invalid items that occur within a group. Administrators and users may assign heterogeneous objects to a plurality of groups, nest groups within groups without any limits on the nesting level, and run any function against a group.

Figure 1:
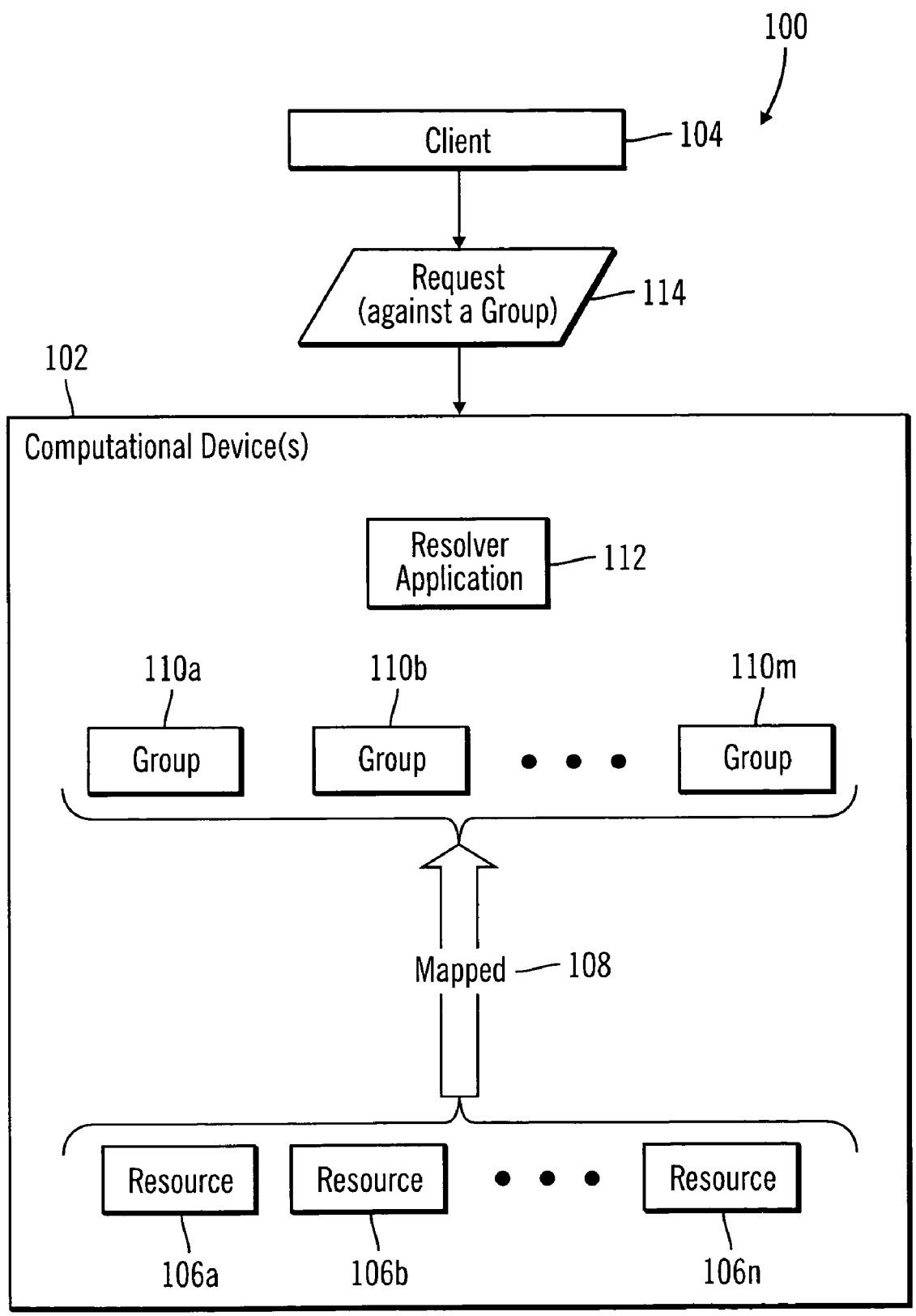
FIG. 1 illustrates a block diagram of a computing environment in accordance with certain embodiments.

FIG. 1 illustrates a block diagram of a computing environment 100 in accordance with certain embodiments. The computing environment 100 includes at least one computational device 102 coupled to at least one client 104.

In certain embodiments, the computational device 102 and the client 104 may comprise any suitable computational device, including those presently known in the art, such as, a personal computer, a workstation, a mainframe, a midrange computer, a network appliance, a palm top computer, a telephony device, a blade computer, a hand held computer, etc. The computational device 102 and the client 104 may communicate directly or via any suitable network, including those presently known in the art, such as, a storage area network (SAN), a local area network (LAN), an Intranet, the Internet, etc. While FIG. 1 shows only one client 104 coupled to one computational device 102, in alternative embodiments a plurality of clients may be coupled to a plurality of computational devices.

The computational device 102 is coupled to a plurality of resources 106a, 106b, . . . , 106n, where the plurality of resources 106a . . . 106n may include any suitable resource, including those presently known in the art, such as printers, scanners, disk drive units, tape drive units, copies, fax machines, etc. The plurality of resources 106a . . . 106n may be represented as objects and may be implemented in hardware, software, or firmware or any combination thereof. While the resources 106a . . . 106n are shown inside the computational device 102, in certain alternative embodiments the resources 106a . . . 106n may be inside or outside one or more computational devices.

The plurality of resources 106a . . . 106n may be mapped 108 into a plurality of groups 110a, 110b, . . . , 110m, where each group may include one or more resources and include other groups. For example, group 110a may includes resources 106a, 106b and group 110b. The mapping of resources into groups may be performed by users or administrators from the client 104 or directly from the computational device 102.

The computational device 102 also includes a resolver application 112 implemented in software, firmware, hardware or any combination thereof. The resolver application 112 is any suitable application that resolves invalid items in the groups 110a . . . 110m in order to prevent cycles in the groups 110a . . . 110m.

The client 104 may generate a request 114 against a group of the plurality of groups 110a . . . 110m. On receiving the request, the resolver application 112 may determine whether the group on which the request 114 has to be performed has invalid items, for example, whether there are circular references within the group. If so, the resolver application 112 removes the invalid items from the group before satisfying the request 114 from the client 104.

Therefore, FIG. 1 illustrates certain embodiments in which the resolver application 112 removes invalid items from a group, such that, requests are not performed on invalid items within a group.

Figure 2:
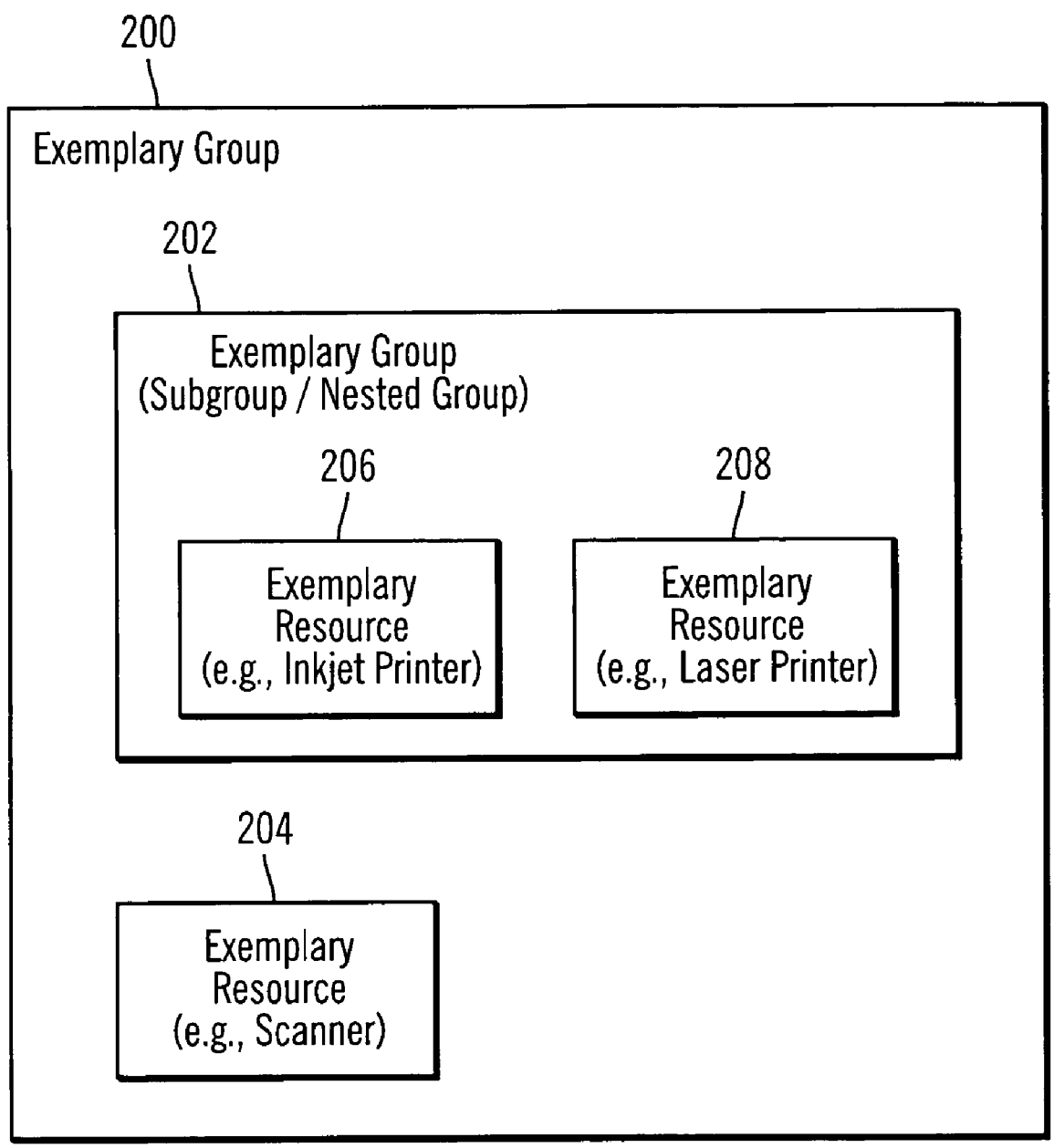
FIG. 2 illustrates a block diagram of an exemplary group, in accordance with certain embodiments.

FIG. 2 illustrates a block diagram of an exemplary group 200 implemented in the computing environment 100, in accordance with certain embodiments.

The exemplary group 200 includes another exemplary group 202 which can be referred to as a subgroup or a nested group. The exemplary group 200 also includes an exemplary resource 204, such as, a scanner.

The exemplary group 202 includes a first exemplary resource 206, such as, an inkjet printer, and a second exemplary resource 208, such as a laser printer. Therefore, the exemplary group 202 may correspond to printers and include an inkjet printer and a laser printer. The exemplary group 202 and the exemplary resource 204 may be referred to as top level items of the exemplary group 202.

Therefore, FIG. 2 illustrates certain embodiments in which the client 104 may send a request 114 to be performed on the exemplary group 200, where the exemplary group 200 may be selected from the plurality of groups 110a . . . 110m. The exemplary group 202, i.e., the subgroup or the nested group, is also selected from the plurality of groups 110a . . . 110m.

Figure 3:
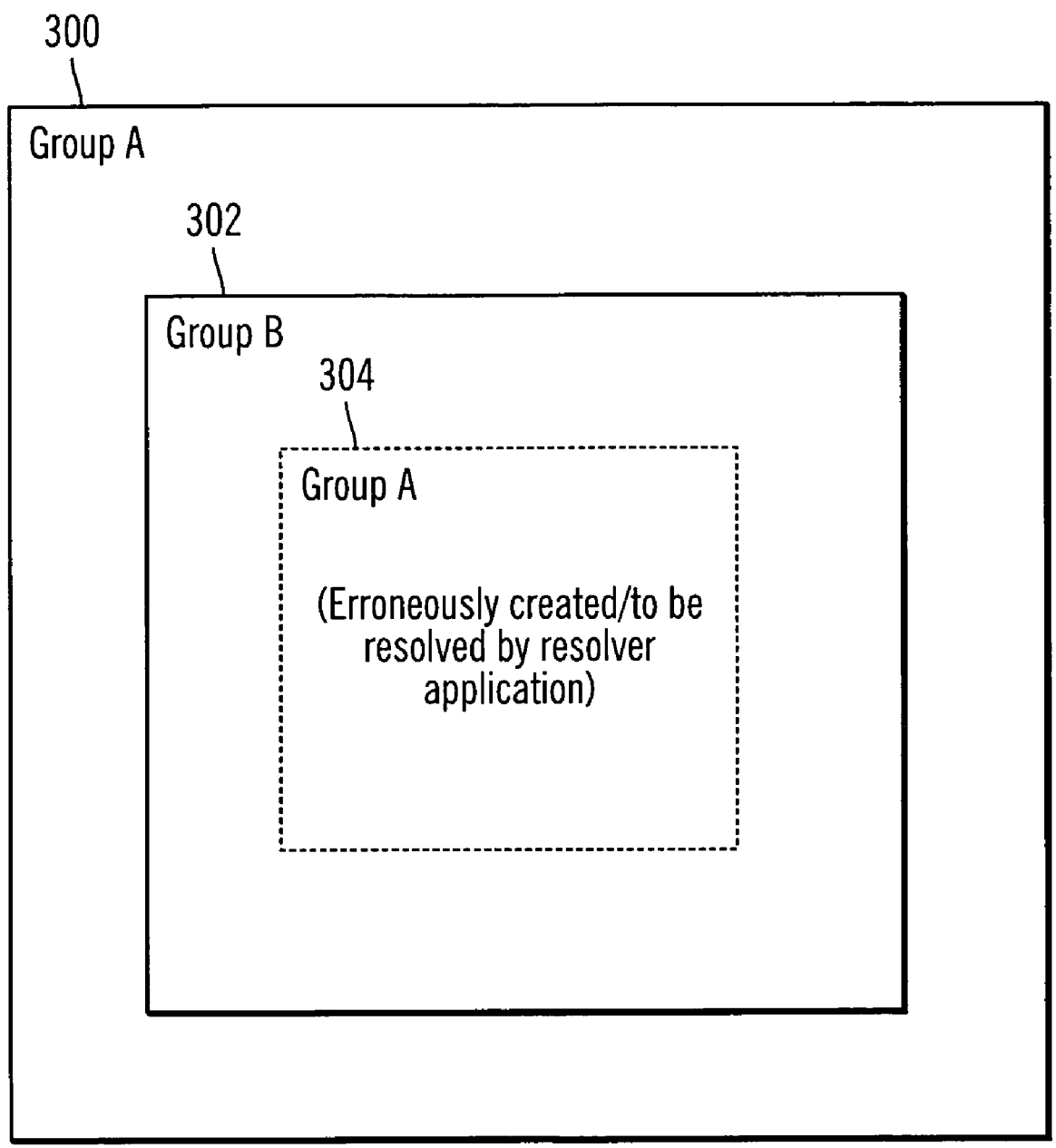
FIG. 3 illustrates a block diagram of nested groups that may be resolved, in accordance with certain embodiments.

FIG. 3 illustrates a block diagram of nested groups that may be resolved, in accordance with certain embodiments. The nested groups may be implemented in the computing environment 100.

In certain embodiments group A 300 may include group B 302 which in turn includes group A 304. Group A 304 may have been nested within group B 204 by a user or an administrator, and the nesting may cause a circular reference. In certain embodiments, the resolver application 112 removes the invalid nested group A 304 and eliminates the circular reference.

Therefore, FIG. 3 illustrates certain embodiments in which the resolver application 112 removes a circular reference from nested groups in the computing environment 100.

Figure 4:
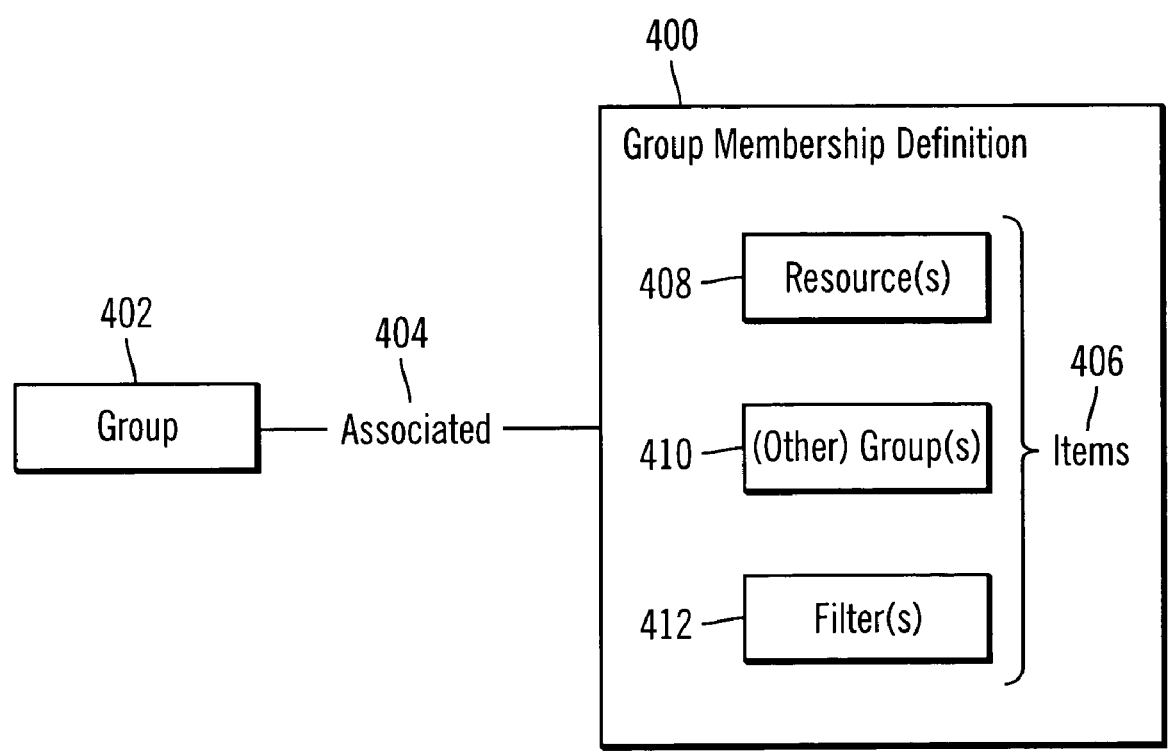
FIG. 4 illustrates a block diagram of a group membership definition that is associated with a group, in accordance with certain embodiments.

FIG. 4 illustrates a block diagram of a group membership definition 400 that is associated with a group 402. The group membership definition 400 and the group 402 are implemented in the computing device 102 of the computing environment 100.

The group membership definition 400 may be stored in a database management system or in a flat text file, or in any other suitable manner. The group membership definition 400 that is associated 404 with the group 402 may include a plurality of items 406.

The plurality of items 406 may comprise one or more resources 408 selected from the resources 106a . . . 106n, one or more other groups 410 selected from the groups 110a . . . 110m, and one or more filters 412. The filters 412 may be various conditions or operations that may be applied to groups or resources and that may be performed by requests, such as request 114, from the client 104, The group membership definition 400 includes information that is used to create a group membership list that is created by the resolver application 112.

Therefore, FIG. 4 illustrates certain embodiments in which a group membership definition 400 stores items of a group 402. The group membership definition 400 may be implemented in any suitable data structure in the computing environment 100.

Figure 5:
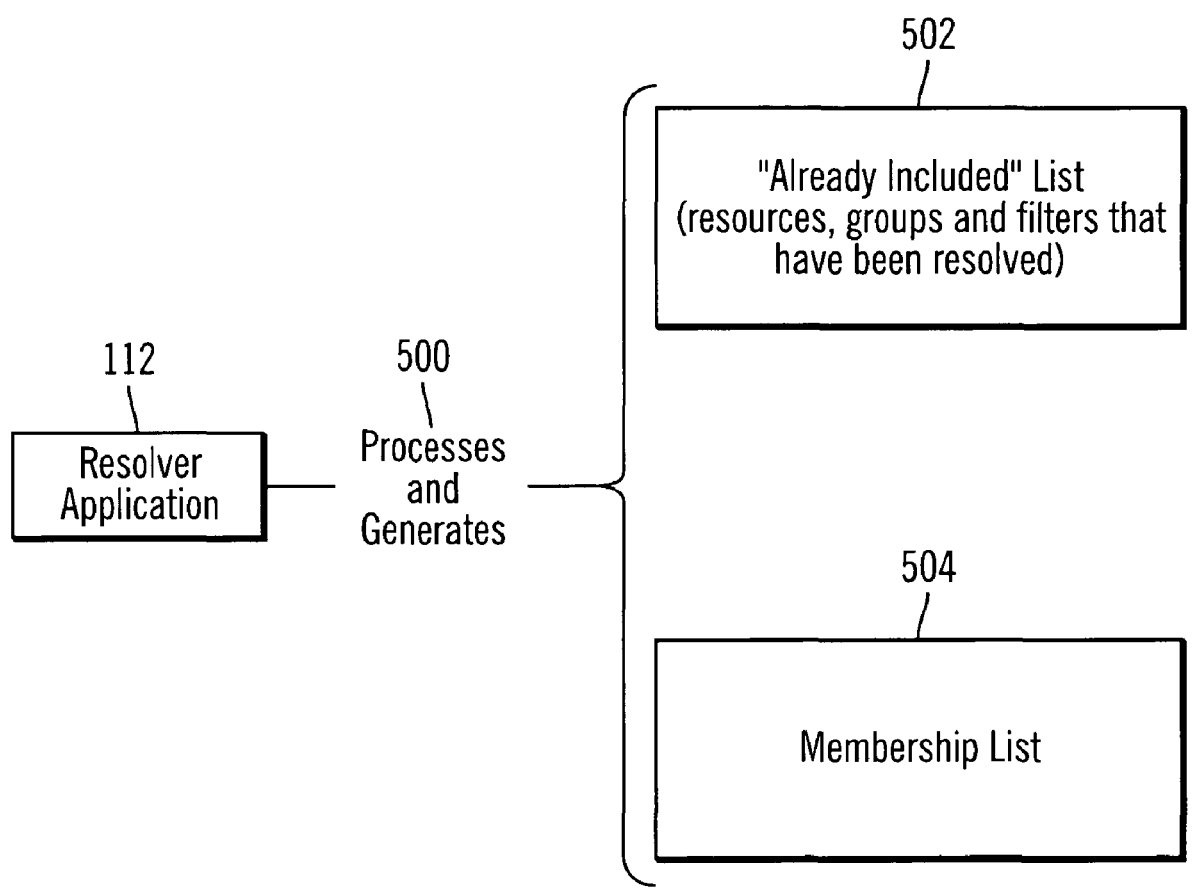
FIG. 5 illustrates how a resolver application processes and generates an already included list and a membership list, in accordance with certain embodiments.

FIG. 5 illustrates how the resolver application 112 processes and generates 500 an already included list 502 and a membership list 504, in accordance with certain embodiments. The already included list 502 and the membership list 504 may be implemented in the computational device 102 of the computing environment 100.

The already included list 502 includes resources, groups and filters that have already been resolved, i.e., processed, by the resolver application 112, and the membership list 504 includes only valid items for a group.

When a request 114 is received for an operation on a group that includes subgroups, the resolver application 112 recursively determines valid items for a group by excluding those items that have already been determined to be included in the group. The items that have already been determined to be included in the group are added to the already included list 502.

Therefore, FIG. 5 illustrates certain embodiments in which the resolver application 112 generates a membership list 504 of valid items for a group and an already included list 502 that includes items that have been already included in a group and the nested items within the group.

Figure 6:
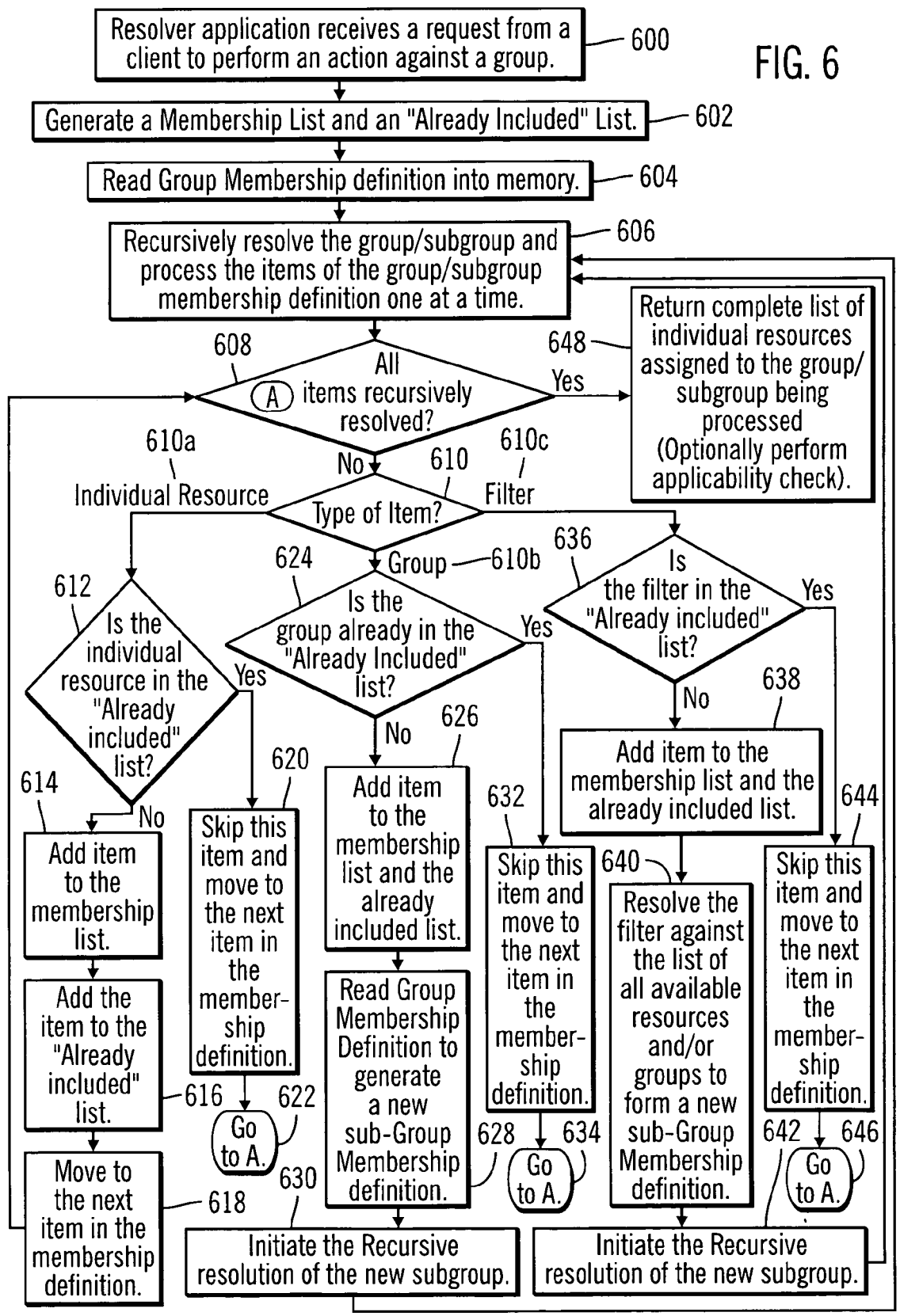
FIG. 6 illustrates a flowchart that shows the resolution of group membership for resources, in accordance with certain embodiments.

FIG. 6 illustrates a flowchart that shows the resolution of group membership for resources, in accordance with certain embodiments. The operations may be implemented in the resolver application 112 of the computing device 102.

Control starts at block 600, where the resolver application 112 receives a request from a client 104 to perform an action against a group 402, where the group is included in the groups 110a . . . 110m. The resolver application 112 generates (at block 602) a membership list 504 and an already included list 502 and reads (at block 604) the group membership definition 400 into memory.

The resolver application 112 starts recursively resolving (at block 606) the group/subgroup 402 and processes the items 406 of the group/subgroup membership definition 400 one at a time. Control proceeds to block 608, where the resolver application 112 determines whether all items have been recursively resolved. Recursive resolution or determination implies that all nested items within all levels of nesting have been processed. If all items have not been recursively resolved, then the resolver application 112 determines (at block 610) the type of item being processed from the group/subgroup membership definition 400.

If at block 610, the type of item determined is an individual resource 610a then the resolver application 112 determines (at block 612) whether the individual resource in the already included list 502. If not, the resolver application 112 adds (at block 614) the individual resource to the membership list 504 and then adds (at block 616) the individual resource to the already included list 502. The resolver application 112 moves (at block 618) to process the next item in the membership definition and control returns to block 608.

If at block 612, the resolver application 112 determines that the individual resource is in the already included list 502, then the resolver application 112 skips (at block 620) the processing of the individual resource and moves to the next item in the group/subgroup membership definition 400 and control returns (at block 622) to block 608 to recursively process further items.

If at block 610, the resolver application 112 determines that the type of item is a group 610b, then the resolver application 112 determines (at block 624) if the group already in the already included list 502. If not, the resolver application adds (at block 626) the item, i.e., the group, to the membership list 504 and the already included list 502.

The resolver application 112 then reads (at block 628) the group/subgroup membership definition to generate a new subgroup membership definition corresponding to the group that has been added to the membership list 504 and the already included list 502. The resolver application 112 then initiates (at block 630) the recursive resolution of the new subgroup membership definition and control returns to block 606.

If at block 624, the resolver application 112 determines that the group is already in the already included list 502 then the resolver application skips (at block 632) the item, i.e., the group, and moves to the next item in the group membership definition. Control returns (at block 634) to block 608.

If the resolver application 112 determines (at block 610) that the type of item is a filter 610c, then the resolver application 112 determines (at block 636) whether the filter in the already included list 502. If so, the resolver application 112 adds (at block 638) the item, i.e., the filter, to the membership list 504 and the already included list 502.

The resolver application 112 resolves (at block 640) the filter against the list of all available resources and/or groups to form a new subgroup membership definition and initiates (at block 642) the recursive resolution of the new subgroup membership definition.

If at block 636 the resolver application 112 determines that the filter is in the already included list 502 then the resolver application skips (at block 644) the processing of the item, i.e., the filter, and moves to the next item in the group membership definition and control returns (at block 646) to block 608.

If at block 608, the resolver application 112 determines that all items have been recursively resolved, i.e., processed, then the resolver application 112 returns (at block 648) the complete list of individual resources assigned to the group/subgroup being processed. In certain embodiments, the resolver application 112 may optionally perform an applicability check in which the membership list is further reduced to only resources that are applicable for the function being requested by the request 114. For example, after the initial membership list is completed, only resources in the initial membership list which pass through the applicability check are added to the new list and this new list is returned for further processing rather than the initially created membership list at block 648. In alternative embodiments, prior to adding an item to the membership list 504 (e.g., prior to the execution of block 614) the applicability check may be performed. Only applicable resources are added to the membership list and regardless of the result of the applicability check, the resource is added to the already included list 502.

The approach of generating a new list after the generation of the initial membership list may be preferred in certain embodiments, whereas the approach of performing the applicability check prior to adding the item to the membership list may be preferred in other embodiments. If timestamps are stored in association with the creation of membership lists and the modification of groups and/or resources, then a plurality of requests for actions against a group to dynamically resolve the group membership can be resolved only once and subsequently a statically stored membership list may be used until the timestamp of a group or resource is modified.

Therefore FIG. 6 illustrates certain embodiments in which a resolver application 112 resolves invalid items in groups and generates a membership list 504 against which a request 114 is processed.

Figure 7:
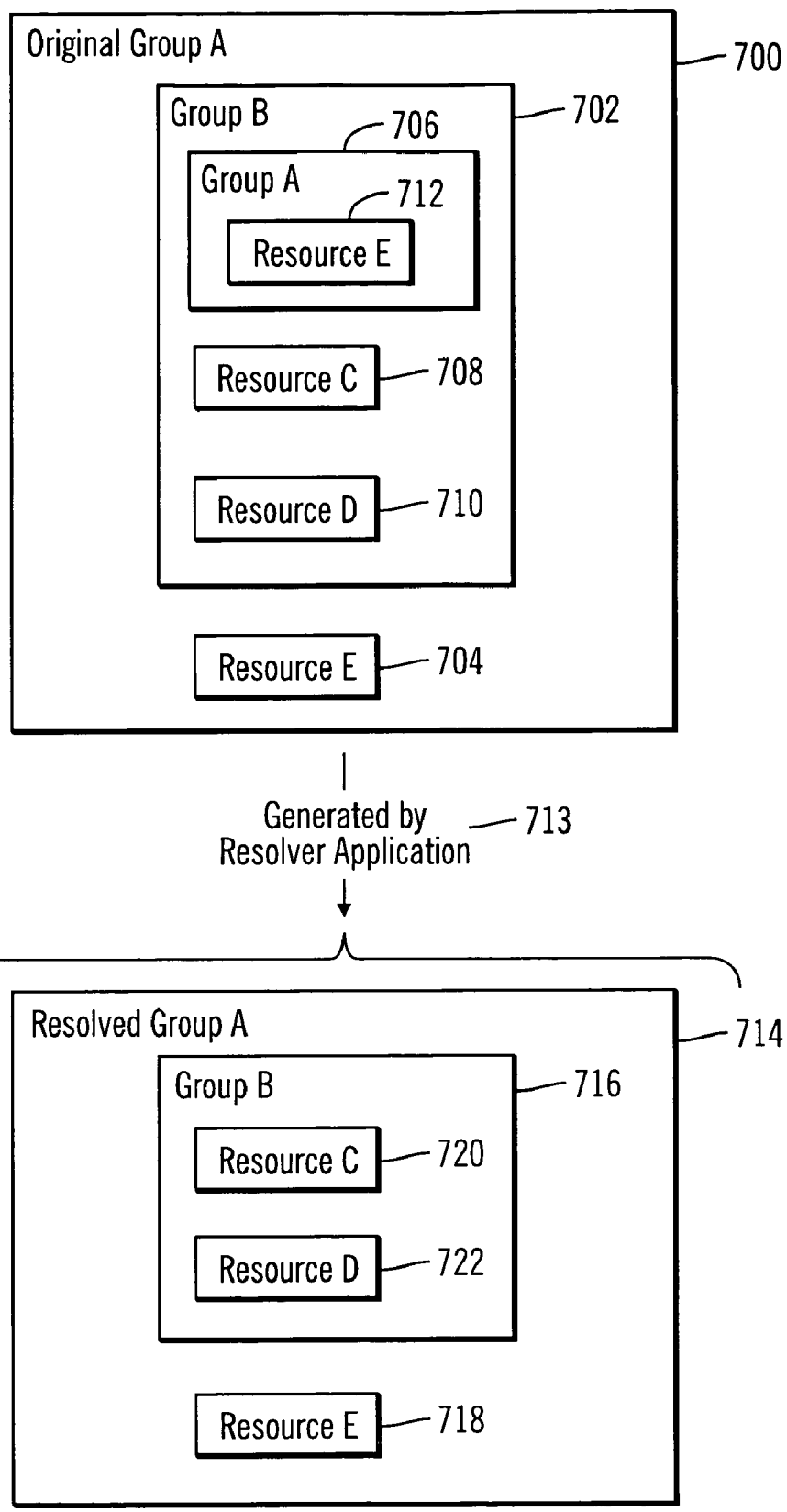
FIG. 7 illustrates an exemplary result generated by the resolver application that resolves group membership, in accordance with certain embodiments.

FIG. 7 illustrates an exemplary result generated by the resolver application 112 that resolves group membership, in accordance with certain embodiments. The result may be generated in the computing environment 100.

An original group A 700 may include a group B 702 and a resource E 704. Group B 702 may include group A 706 once again, resource C 708 and resource D 710. The nested group A 706 may include resource E 712.

The resolver application 112 may cause the generation 713 of a resolved group A 714 that includes group B 716 and resource E 718, where group B 716 includes resource C 720 and resource D 722. The nested group A 706 with the included resource E 712 in original group A 700 is no longer present in the resolved group A 714.

Therefore, FIG. 7 illustrates certain embodiments in which the resolved group A that is generated from the original group A 700 does not include invalid groups or resources.

Certain embodiments store group information and dynamically resolve group membership as necessary in a manner that is appropriate for a function being executed against a group. The groups may be of any size or contain any number of levels of nested groups. Additionally, the groups may include any number of circular references or objects of any type. The same resources can be assigned to a plurality of groups, and this allows users and administrators to assign a given set of physical resources to more than one logical grouping.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 8:
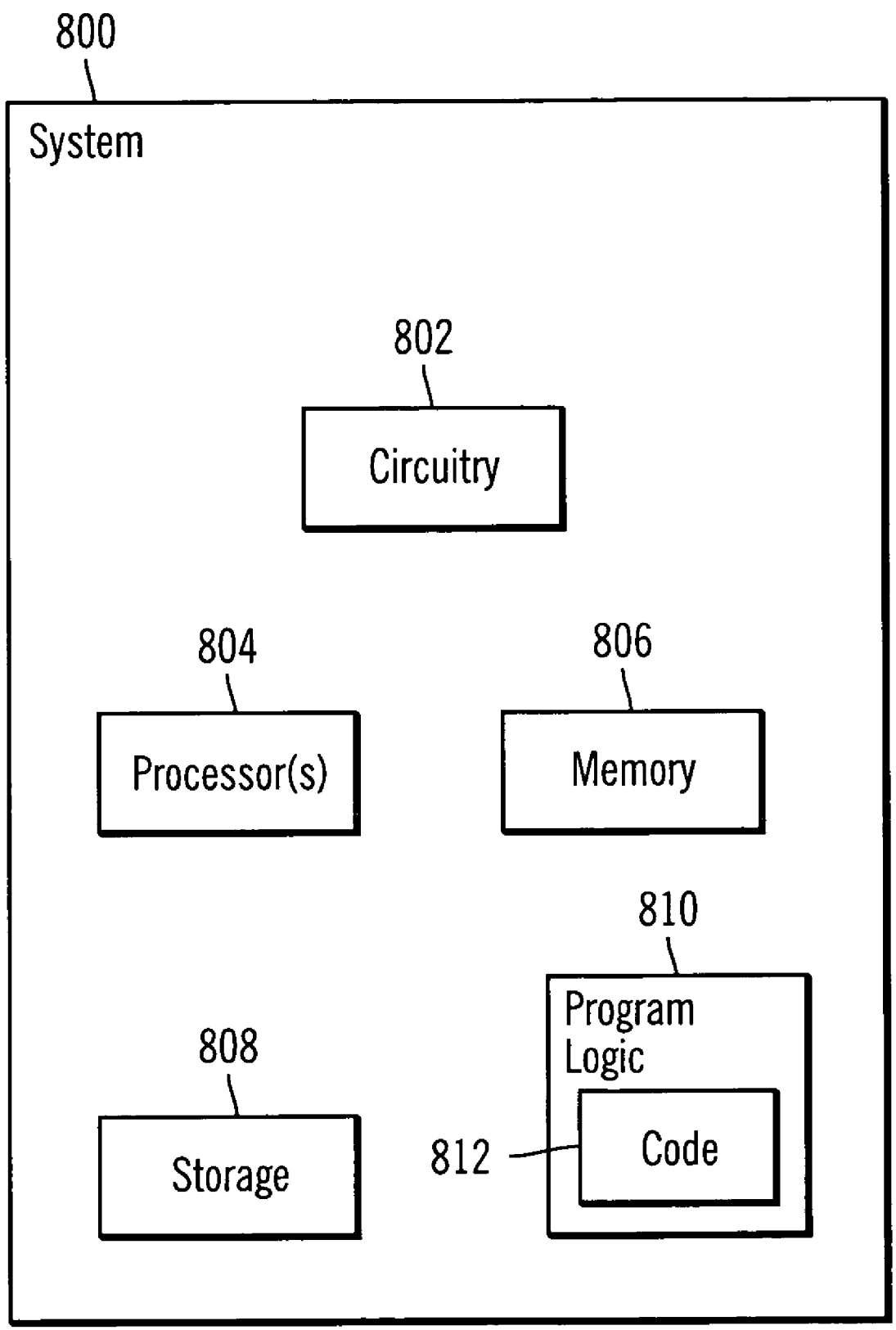
FIG. 8 illustrates a system in which certain embodiments are implemented.

FIG. 8 illustrates a block diagram of a system 800 in which certain embodiments may be implemented. In certain embodiments, the computational device 102 may be implemented in accordance with the system 800. The system 800 may include a circuitry 802 that may in certain embodiments include a processor 804. The system 800 may also include a memory 806 (e.g., a volatile memory device), and storage 808. Certain elements of the system 800 may or may not be found in the computational device 102. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments. Certain embodiments may cause the operations of the described embodiments to be implemented in software modules, where the software modules may include applications, functions, procedures, processes, threads, or other entities that are capable of execution on a processor.

At least certain of the operations illustrated in FIG. 6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

grouping a plurality of resources into a plurality of groups, wherein one group may be included in another in the plurality of groups, and wherein the plurality of resources and the plurality of groups comprise items;

maintaining a group membership definition for each group of the plurality of groups, wherein the group membership definition comprises one or more resources, one or more groups, and one or more filters, wherein the one or more filters comprise operations that are applicable to the one or more groups and the one or more resources;

recursively determining, by a processor, via processing of the group membership definition, valid items in a group of the plurality of groups by excluding those items that have already been determined to be included in the group, wherein timestamps are maintained in association with creation of membership lists and for modifications to the plurality of groups and generation of the recursively determined valid items, wherein the recursively determining further comprises: determining whether an item is one of a selected resource; determining whether the item is one of a selected group; determining whether the item is one of a selected filter; in response to determining that the item is the selected resource, determining whether the selected resource is in an already included list that stores all previously processed items; in response to determining that the item is the selected group, determining whether the selected group is in the already included list; and in response to determining that the item is the selected filter, determining whether the selected filter is in the already included list, wherein all items that are in the already included list are excluded from being added to a membership list that accumulates the valid items; and determining by using the timestamps whether to perform an additional recursive determination for new valid items for a plurality of requests on the plurality of groups, wherein a plurality of requests for actions against a selected group to resolve group membership is resolved once and subsequently a statically stored membership list is used until a selected timestamp is modified, and wherein:

in response to determining that a first group contains a second group and a first resource, wherein the second group contains a third group and a second resource, wherein the third group is the same as the first group, and the second resource is the same as the first resource, removing the third group and the second resource from the first group.

2. The method of claim 1, wherein while recursively determining valid items a determination is made that all nested items within all levels of nesting have been processed, the method further comprising:

receiving a request to perform an action against the group; and performing the action against at least one determined valid item in the group.

3. The method of claim 1, further comprising:

performing an applicability check to reduce the recursively determined valid items to those items on which a function being requested by a client are applicable.

4. A system, comprising:

memory; and processor coupled to the memory, wherein the processor is capable of performing operations, the operations comprising:

grouping a plurality of resources into a plurality of groups, wherein one group may be included in another in the plurality of groups, and wherein the plurality of resources and the plurality of groups comprise items;

maintaining a group membership definition for each group of the plurality of groups, wherein the group membership definition comprises one or more resources, one or more groups, and one or more filters, wherein the one or more filters comprise operations that are applicable to the one or more groups and the one or more resources;

recursively determining, via processing of the group membership definition, valid items in a group of the plurality of groups by excluding those items that have already been determined to be included in the group, wherein timestamps are maintained in association with creation of membership lists and for modifications to the plurality of groups and generation of the recursively determined valid items, wherein the recursively determining further comprises: determining whether an item is one of a selected resource; determining whether the item is one of a selected group; determining whether the item is one of a selected filter; in response to determining that the item is the selected resource, determining whether the selected resource is in an already included list that stores all previously processed items; in response to determining that the item is the selected group, determining whether the selected group is in the already included list; and in response to determining that the item is the selected filter, determining whether the selected filter is in the already included list, wherein all items that are in the already included list are excluded from being added to a membership list that accumulates the valid items; and determining by using the timestamps whether to perform an additional recursive determination for new valid items for a plurality of requests on the plurality of groups, wherein a plurality of requests for actions against a selected group to resolve group membership is resolved once and subsequently a statically stored membership list is used until a selected timestamp is modified, and wherein:

in response to determining that a first group contains a second group and a first resource, wherein the second group contains a third group and a second resource, wherein the third group is the same as the first group, and the second resource is the same as the first resource, removing the third group and the second resource from the first group.

5. The system of claim 4, wherein while recursively determining valid items a determination is made that all nested items within all levels of nesting have been processed, the operations further comprising:

receiving a request to perform an action against the group; and performing the action against at least one determined valid item in the group.

6. The system of claim 4, the operations further comprising:

performing an applicability check to reduce the recursively determined valid items to those items on which a function being requested by a client are applicable.

7. A hardware implemented computer readable storage medium, wherein code stored in the hardware implemented computer readable storage medium when executed by a processor causes operations, the operations comprising:

grouping a plurality of resources into a plurality of groups, wherein one group may be included in another in the plurality of groups, and wherein the plurality of resources and the plurality of groups comprise items;

maintaining a group membership definition for each group of the plurality of groups, wherein the group membership definition comprises one or more resources, one or more groups, and one or more filters, wherein the one or more filters comprise operations that are applicable to the one or more groups and the one or more resources;

recursively determining, via processing of the group membership definition, valid items in a group of the plurality of groups by excluding those items that have already been determined to be included in the group, wherein timestamps are maintained in association with creation of membership lists and for modifications to the plurality of groups and generation of the recursively determined valid items, wherein the recursively determining further comprises: determining whether an item is one of a selected resource; determining whether the item is one of a selected group; determining whether the item is one of a selected filter; in response to determining that the item is the selected resource, determining whether the selected resource is in an already included list that stores all previously processed items; in response to determining that the item is the selected group, determining whether the selected group is in the already included list; and in response to determining that the item is the selected filter, determining whether the selected filter is in the already included list, wherein all items that are in the already included list are excluded from being added to a membership list that accumulates the valid items; and determining by using the timestamps whether to perform an additional recursive determination for new valid items for a plurality of requests on the plurality of groups, wherein a plurality of requests for actions against a selected group to resolve group membership is resolved once and subsequently a statically stored membership list is used until a selected timestamp is modified, and wherein:

in response to determining that a first group contains a second group and a first resource, wherein the second group contains a third group and a second resource, wherein the third group is the same as the first group, and the second resource is the same as the first resource, removing the third group and the second resource from the first group.

8. The hardware implemented computer readable storage medium of claim 7, wherein while recursively determining valid items a determination is made that all nested items within all levels of nesting have been processed, the operations further comprising:

receiving a request to perform an action against the group; and performing the action against at least one determined valid item in the group.

9. The hardware implemented computer readable storage medium of claim 7, the operations further comprising:

performing an applicability check to reduce the recursively determined valid items to those items on which a function being requested by a client are applicable.

10. A system, comprising:

a plurality of resources; and a computational device coupled to the plurality of resources, wherein the computational device performs:

grouping the plurality of resources into a plurality of groups, wherein one group may be included in another in the plurality of groups, and wherein the plurality of resources and the plurality of groups comprise items;

maintaining a group membership definition for each group of the plurality of groups, wherein the group membership definition comprises one or more resources, one or more groups, and one or more filters, wherein the one or more filters comprise operations that are applicable to the one or more groups and the one or more resources;

recursively determining, via processing of the group membership definition, valid items in a group of the plurality of groups by excluding those items that have already been determined to be included in the group, wherein timestamps are maintained in association with creation of membership lists and for modifications to the plurality of groups and generation of the recursively determined valid items, wherein the recursively determining further comprises: determining whether an item is one of a selected resource; determining whether the item is one of a selected group; determining whether the item is one of a selected filter; in response to determining that the item is the selected resource, determining whether the selected resource is in an already included list that stores all previously processed items; in response to determining that the item is the selected group, determining whether the selected group is in the already included list; and in response to determining that the item is the selected filter, determining whether the selected filter is in the already included list, wherein all items that are in the already included list are excluded from being added to a membership list that accumulates the valid items; and determining by using the timestamps whether to perform an additional recursive determination for new valid items for a plurality of requests on the plurality of groups, wherein a plurality of requests for actions against a selected group to resolve group membership is resolved once and subsequently a statically stored membership list is used until a selected timestamp is modified, and wherein:

in response to determining that a first group contains a second group and a first resource, wherein the second group contains a third group and a second resource, wherein the third group is the same as the first group, and the second resource is the same as the first resource, removing the third group and the second resource from the first group.

11. A method for deploying computing infrastructure, comprising integrating computer-readable code stored in a computer readable storage medium into a computing system, wherein the code in combination with the computing system is capable of performing:

grouping a plurality of resources into a plurality of groups, wherein one group may be included in another in the plurality of groups, and wherein the plurality of resources and the plurality of groups comprise items;

maintaining a group membership definition for each group of the plurality of groups, wherein the group membership definition comprises one or more resources, one or more groups, and one or more filters, wherein the one or more filters comprise operations that are applicable to the one or more groups and the one or more resources;

recursively determining, by a processor, via processing of the group membership definition, valid items in a group of the plurality of groups by excluding those items that have already been determined to be included in the group, wherein timestamps are maintained in association with creation of membership lists and for modifications to the plurality of groups and generation of the recursively determined valid items, wherein the recursively determining further comprises: determining whether an item is one of a selected resource; determining whether the item is one of a selected group; determining whether the item is one of a selected filter; in response to determining that the item is the selected resource, determining whether the selected resource is in an already included list that stores all previously processed items; in response to determining that the item is the selected group, determining whether the selected group is in the already included list; and in response to determining that the item is the selected filter, determining whether the selected filter is in the already included list, wherein all items that are in the already included list are excluded from being added to a membership list that accumulates the valid items; and determining by using the timestamps whether to perform an additional recursive determination for new valid items for a plurality of requests on the plurality of groups, wherein a plurality of requests for actions against a selected group to resolve group membership is resolved once and subsequently a statically stored membership list is used until a selected timestamp is modified, and wherein:

in response to determining that a first group contains a second group and a first resource, wherein the second group contains a third group and a second resource, wherein the third group is the same as the first group, and the second resource is the same as the first resource, removing the third group and the second resource from the first group.

12. A system implemented in a computational device, the system comprising:

a processor implemented in hardware;

a first software module whose instructions are executed by the processor, wherein the first software module groups a plurality of resources into a plurality of groups, wherein one group may be included in another in the plurality of groups, and wherein the plurality of resources and the plurality of groups comprise items; and a second software module, wherein the second software module maintains a group membership definition for each group of the plurality of groups, wherein the group membership definition comprises one or more resources, one or more groups, and one or more filters, wherein the one or more filters comprise operations that are applicable to the one or more groups and the one or more resources;

a third software module that recursively determines, via processing of the group membership definition, valid items in a group of the plurality of groups by excluding those items that have already been determined to be included in the group, wherein timestamps are maintained in association with creation of membership lists and for modifications to the plurality of groups and generation of the recursively determined valid items, wherein recursive determining further comprises: determining whether an item is one of a selected resource; determining whether the item is one of a selected group; determining whether the item is one of a selected filter; in response to determining that the item is the selected resource, determining whether the selected resource is in an already included list that stores all previously processed items; in response to determining that the item is the selected group, determining whether the selected group is in the already included list; and in response to determining that the item is the selected filter, determining whether the selected filter is in the already included list, wherein all items that are in the already included list are excluded from being added to a membership list that accumulates the valid items and wherein the timestamps are used to determine whether to perform an additional recursive determination for new valid items for a plurality of requests on the plurality of groups, wherein a plurality of requests for actions against a selected group to resolve group membership is resolved once and subsequently a statically stored membership list is used until a selected timestamp is modified, and wherein:

in response to determining that a first group contains a second group and a first resource, wherein the second group contains a third group and a second resource, wherein the third group is the same as the first group, and the second resource is the same as the first resource, removing the third group and the second resource from the first group.

13. The system of claim 10, wherein while recursively determining valid items a determination is made that all nested items within all levels of nesting have been processed, the system further comprising:

means for receiving a request to perform an action against the group; and means for performing the action against at least one determined valid item in the group.

14. The method for deploying computing infrastructure of claim 11, wherein while recursively determining valid items a determination is made that all nested items within all levels of nesting have been processed, and wherein the code in combination with the computing system is further capable of performing:

receiving a request to perform an action against the group; and performing the action against at least one determined valid item in the group.

15. The system of 12, wherein while recursively determining valid items a determination is made that all nested items within all levels of nesting have been processed, wherein a request is received to perform an action against the group, and wherein the action is performed against at least one determined valid item in the group.

16. The system of claim 10, wherein the computational device further performs:

performing an applicability check to reduce the recursively determined valid items to those items on which a function being requested by a client are applicable.

17. The method for deploying computing infrastructure of claim 11, wherein the code in combination with the computing system is further capable of performing:

performing an applicability check to reduce the recursively determined valid items to those items on which a function being requested by a client are applicable.

18. The system of 12, wherein the system is operable to:

perform an applicability check to reduce the recursively determined valid items to those items on which a function being requested by a client are applicable.

19. The method of claim 1, wherein the one or more resources are selected from a group consisting of inkjet printers, laser printers, and scanners, wherein an inkjet printer and a laser printer form a nested group.

20. The system of claim 4, wherein the one or more resources are selected from a group consisting of inkjet printers, laser printers, and scanners, wherein an inkjet printer and a laser printer form a nested group.

21. The hardware implemented computer readable storage medium of claim 7, wherein the one or more resources are selected from a group consisting of inkjet printers, laser printers, and scanners, wherein an inkjet printer and a laser printer form a nested group.

22. The system of claim 10, wherein the one or more resources are selected from a group consisting of inkjet printers, laser printers, and scanners, wherein an inkjet printer and a laser printer form a nested group.

23. The method for deploying computing infrastructure of claim 11, wherein the one or more resources are selected from a group consisting of inkjet printers, laser printers, and scanners, wherein an inkjet printer and a laser printer form a nested group.

24. The system of claim 12, wherein the one or more resources are selected from a group consisting of inkjet printers, laser printers, and scanners, wherein an inkjet printer and a laser printer form a nested group.

\* \* \* \* \*